United States Patent [19]

Duback et al.

[11] Patent Number: 5,456,658
[45] Date of Patent: Oct. 10, 1995

[54] CUSTOM-FITTING BODY PART PROTECTOR WITH CURE-RETARDING STORAGE SYSTEM, METHOD OF CONSTRUCTING A BODY PART PROTECTOR, AND METHOD OF CUSTOM-FITTING A BODY PART PROTECTOR

[75] Inventors: Jeffrey Duback, Davidson; Eric D. Vaughter; A. Bruce Parker, both of Charlotte, all of N.C.

[73] Assignee: Parker Medical Associates, Charlotte, N.C.

[21] Appl. No.: 306,467

[22] Filed: Sep. 15, 1994

Related U.S. Application Data

[63] Continuation-in-part of Ser. No. 252,740, Jun. 2, 1994, which is a continuation-in-part of Ser. No. 860,005, Mar. 30, 1992, abandoned.

[51] Int. Cl.[6] ..................................................... B32B 7/00
[52] U.S. Cl. .................. 602/8; 2/2; 206/438; 428/68; 428/76; 428/102; 428/192; 428/193; 428/246; 428/251; 428/285; 602/6; 602/27
[58] Field of Search .................. 602/6, 8, 27; 428/68, 428/76, 246, 251, 285, 102, 192, 193; 206/438; 2/2

[56] References Cited

U.S. PATENT DOCUMENTS 4,411,262 10/1983 von Bonin et al. ..................... 128/90
4,770,299 9/1988 Parker ..................................... 206/409
4,899,738 2/1990 Parker ..................................... 128/90

FOREIGN PATENT DOCUMENTS 061642 10/1982 European Pat. Off. ........ A61F 13/04
286426 10/1988 European Pat. Off. ........ A61F 13/04

Primary Examiner—James J. Bell
Attorney, Agent, or Firm—W. Thad Adams, III

[57] ABSTRACT

A body part protector assembly for being custom-fitted to a body part, and including a body part protector having at least two connected-together pad segments. Each of the pad segments having an initially flexible protective layer comprised of a fabric impregnated with a moisture-curable resin which hardens upon curing to form a rigid structure which retains a body part-defined shape into which it is molded during curing. Respective removable covers separately cover and enclose each of the at least two connected pad segments, and are individually removable from their respective pad segments to expose the initially flexible protective layer of that pad segment when the body part protector is to be wetted and fitted to the body part for curing into the proper molded shape. The removable covers have moisture transmission-retarding properties for enabling each pad segment to be individually and sequentially fitted to the body part without other pad segments being wetted and cured before fitting of that pad segment is complete. An outer moisture-proof protective pouch is provided within which the body part protector is sealed for storage in the absence of moisture until the pad is to be molded to the body part to be protected.

19 Claims, 7 Drawing Sheets

5,456,658

CUSTOM-FITTING BODY PART PROTECTOR WITH CURE-RETARDING STORAGE SYSTEM, METHOD OF CONSTRUCTING A BODY PART PROTECTOR, AND METHOD OF CUSTOM-FITTING A BODY PART PROTECTOR

This application is a continuation-in-part of application Ser. No. 08/252,740. filed on Jun. 2, 1994, which is a continuation-in-part of application Ser. No. 860,005, filed on Mar. 30, 1992 now abandoned.

TECHNICAL FIELD AND BACKGROUND OF THE INVENTION

This invention relates to a custom-fitted body part protector such as a shin, thigh, or arm pad used to protect against injuries to sports participants, and to protect previous injuries which sports competition continues. The disclosure of this application relates specifically to a baseball knee, shin and foot protector, commonly referred to as a "shin protector" or "shin guard," such as used by catchers, although the invention relates to and has application to any body-part protector. The term "body" is intended to include structures other than animal bodies, and may include protectors intended to be molded to machines, particularly sensitive, expensive equipment, and other objects which may require custom-fitted, multi-part protective packaging. The invention of this application enhances and improves the fit of the protector by retarding the curing of a second pad segment of the protector, while another one is being fitted to the wearer.

The invention takes advantage of polymer chemistry to permit quick and easy molding of a pad to the body part to be protected. Shock attenuation is increased since the custom fit provides spreads contact between the protective pad and the body member over a wider surface area. Instead of buying one of a few standard sizes, a protector according to the invention can be molded exactly to the shape of the body part of the user, thus obtaining a more accurate and thus more protective fit. The protector may then be held in place by straps or bands, or worn inside a sock or wrapping.

Prior art body protectors include numerous types of guards which are fitted over the body part, such as the shin. These pads typically include a soft component to place near the skin and a hard, shell-like outer cover. The soft component is intended not only to provide a cushion, but also to accommodate itself to the varying configurations of differing sized and shaped body parts. For this reason, the cushioned part is substantially greater in thickness than required merely to provide the required amount of shock attenuation.

Other prior art devices include pads which are constructed of thermosetting materials, which are heated and then formed to the body while heated. These products require a source of heat, and are susceptible to either over-or-underheating. In addition, body heat itself can soften or at least increase the flexibility of the pad, thereby decreasing the effectiveness of the protection offered by the pad. Some prior art pads include air bladders which provide an air cushion against injurious blows. Other prior art devices have a plurality of connected-together segments which are hinged for limited movement relative to each other, on the theory that such movement permits the pad to more closely conform to the body part. All of these prior art devices achieve only an approximation of a truly proper and anatomically correct fit.

Nevertheless, some types of body part protectors of necessity have two or more connected-together pad segments, such as a baseball catcher's knee, shin and foot protector, in order to permit free movement while wearing the protector.

The present invention permits quick and easy application of a protective pad to a body part in such a way as to achieve a true custom fit. The moisture curable resin system used results in a very rigid pad, which holds the shape of the molded pad to a very high degree. No heat is required, and a source of water is the only additional substance necessary to achieve a cure. Atmospheric moisture alone will cure the pad into its hardened position in a relatively short period of time, but the resin in or on the pad will typically be activated by dipping in water.

Since more than one pad segment make up the protector, some means must be provided for retarding curing of the second and subsequent pad segments while the first segment is being molded to the body part.

SUMMARY OF THE INVENTION

Therefore, it is an object of the invention to provide a multi-segment body part protector which can be molded to a body part to be protected.

It is another object of the invention to provide a multi-segment body part protector, each segment of which is independently moldable to a body part;

It is another object of the invention to provide a multi-part body part protector which hardens in the presence of moisture to form a very rigid but very lightweight protector.

It is another object of the invention to provide a multi-segment body part protector which is stored in a moisture-proof pouch until ready for application to the body part to be protected.

It is another object of the invention to provide a multi-segment body part protector which includes two or more pad segments.

It is another object of the invention to provide a multi-segment body part protector which includes two or more pad segments which are provided with cure-retarding temporary protective covers which retard transmission of moisture to the pad segments, so that the pad segments can be molded in sequence while the remaining pad segments which have not yet been applied do not begin to cure.

It is another object of the invention to provide a method of constructing a multi-segment body part protector which can be custom-fitted to a wearer.

It is another object of the invention to provide a method of custom-fitting a multi-segment body part protector to a wearer.

These and other objects of the present invention are achieved in the preferred embodiments disclosed below by providing a body part protector assembly for being custom-fitted to a body part, and including a body part protector having at least two connected-together pad segments, each of the pad segments having an initially flexible protective layer comprised of a fabric impregnated with a moisture-curable resin which hardens upon curing to form a rigid structure which retains a body part-defined shape into which it is molded during curing. Respective removable covers separately cover and enclose each of the at least two connected pad segments, and are individually removable from their respective pad segment to expose the initially flexible protective layer of that pad segment when the body part protector is to be wetted and fitted to the body part for curing into the proper molded shape. The removable covers have moisture transmission-retarding properties for enabling each pad segment to be individually and sequentially fitted to the body part without other pad segments being wetted and cured before fitting of that pad segment is complete. An outer moisture-proof protective pouch is provided within which the body part protector is sealed for storage in the absence of moisture until the pad is to be molded to the body part to be protected.

According to one preferred embodiment of the invention, the body part protector includes a flexible inner cushion layer positioned on an inner side of the resin-impregnated layer for being placed closest to the body member.

According to another preferred embodiment of the invention, the fabric comprises a plurality of overlaid thicknesses of fiberglass.

According to yet another preferred embodiment of the invention, the plurality of thicknesses of fiberglass comprises at least five thicknesses and no more than seven thicknesses.

Preferably, the removable covers comprise sheets of plastic film, the plastic film having a thickness of between 1.5 mils and 4 mils.

According to another preferred embodiment of the invention, the outer moisture-proof protective pouch is formed of a laminated structure having at least one layer of plastic film and at least one layer of aluminum foil bonded to the plastic film.

According to yet another preferred embodiment of the invention, the body part protector comprises a baseball catcher's knee, shin and foot protector.

According to yet another preferred embodiment of the invention, the pad segments include a knee pad segment, a shin pad segment and a foot protector.

According to yet another preferred embodiment of the invention, wherein the body part protector includes strap means for securing the body part protector to the leg.

According to yet another preferred embodiment of the invention, the protective cover comprises a plastic film, and wherein the plastic film is sealed around the edge of the respective pad segment for being torn away to expose the pad moisture curable resin.

According to yet another preferred embodiment of the invention, the pad segment includes sewing stitches around the edge thereof, and the edge of the plastic film is held to the pad segment by the sewing stitches.

An embodiment of the method according to the invention comprises a method of constructing a body part protector assembly for being custom-fitted to a body part to be protected, and including the steps of connecting together at least two pad segments for being form-fitted to a body part to define a body part protector, each of the pad segments having an initially flexible protective layer comprised of a fabric impregnated with a moisture-curable resin which hardens upon curing to form a rigid structure which retains a body part-defined shape into which it is molded during curing. The at least two connected pad segments with are covered and enclosed with respective removable covers, each of the removable covers being individually removable from its respective pad segment to expose the initially flexible protective layer of that pad segment when the body part protector is to be wetted and fitted to the body part for curing into the proper molded shape. The removable covers have moisture transmission-retarding properties for enabling each pad segment to be individually and sequentially fitted to the body part without other pad segments being wetted and cured before fitting of that pad segment is complete. The assembled body part protector is placed in an outer moisture-proof protective pouch. The body part protector is sealed within the pouch in the absence of moisture until the body part protector for storage until use.

Preferably, the covers used in the practice of the method described above comprise plastic film.

According to yet another preferred embodiment of the invention, the method includes the step of sewing the edge portion of each protective cover to the edge of its respective pad segment.

An embodiment of another method according to the invention comprises the steps of custom fitting a body-part protector to a the body part to be protected, comprising the steps of providing a body part protector having at least two connected-together pad segments, each of the pad segments having an initially flexible protective layer comprised of a fabric impregnated with a moisture-curable resin which hardens upon curing to form a rigid structure which retains a body part-defined shape into which it is molded during curing, respective removable covers separately covering and enclosing each of the at least two connected pad segments, and being individually removable from its respective pad segment to expose the initially flexible protective layer of that pad segment when the body part protector is to be wetted and fitted to the body part for curing into the proper molded shape, the removable covers having moisture transmission-retarding properties for enabling each pad segment to be individually and sequentially fitted to the body part without other pad segments being wetted and cured before fitting of that pad segment is complete, and an outer moisture-proof protective pouch within which the body part protector is sealed for storage in the absence of moisture until the pad is to be molded to the body part to be protected. When the body part protector is to be applied, the body part protector is removed from its outer, moisture-proof pouch. A first one of the protective covers is removed from a first pad segment. The first pad segment is wetted and then molded to the proper body part for curing and hardening. Each of the steps described above are repeated for each of the other pad segments of the body part protector.

According to another preferred embodiment of the invention, the covers comprise plastic film and the step of removing the plastic film from each of the pad segments comprises tearing the plastic film away from the pad segment.

According to yet another preferred embodiment of the invention, the step of molding the pad segment to the body part comprises conforming the pad segment closely to the shape of the body part and holding the pad segment to the shape of the body part until the pad segment is hardened.

According to yet another preferred embodiment of the invention, the step of holding the pad segment to the shape of the body part comprises the step of over-wrapping the pad segment and the body part while the body part protector is closely conformed to the shape of the body part.

BRIEF DESCRIPTION OF THE DRAWINGS some of the objects of the invention have been set forth above. Other objects and advantages of the invention will appear as the invention proceeds when taken in conjunction with the following drawings, in which.

Figure 6A:
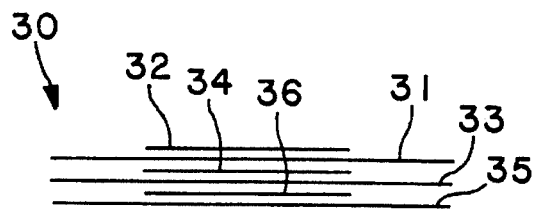
Figure 6B:
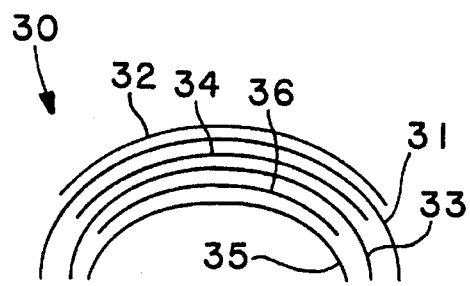
Figure 12:
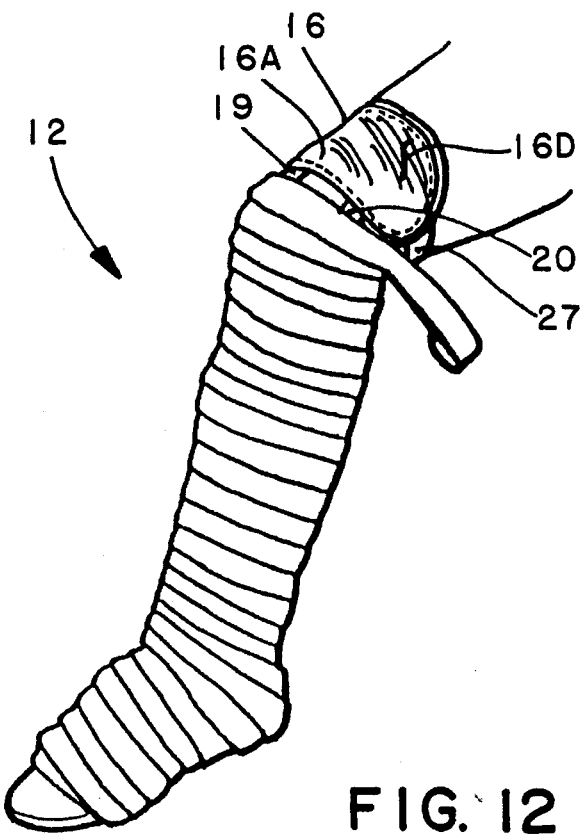
Figure 13:
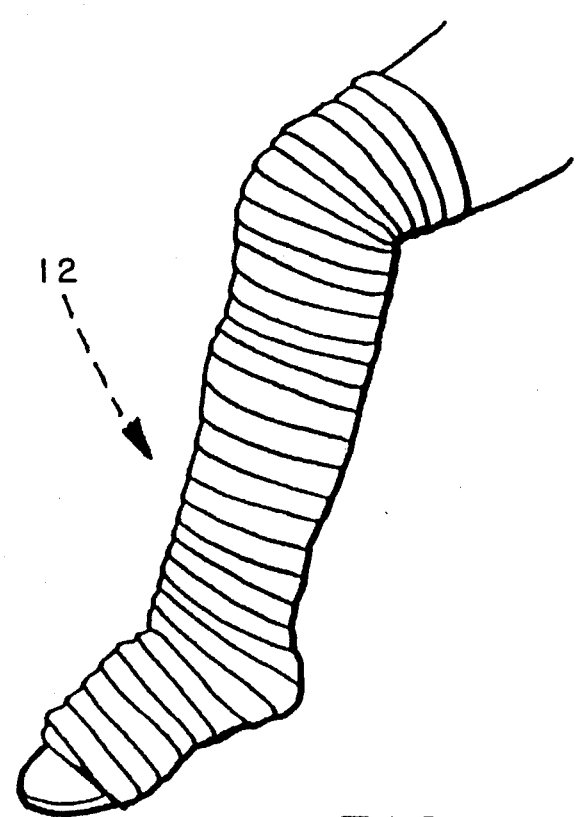
Figure 14:
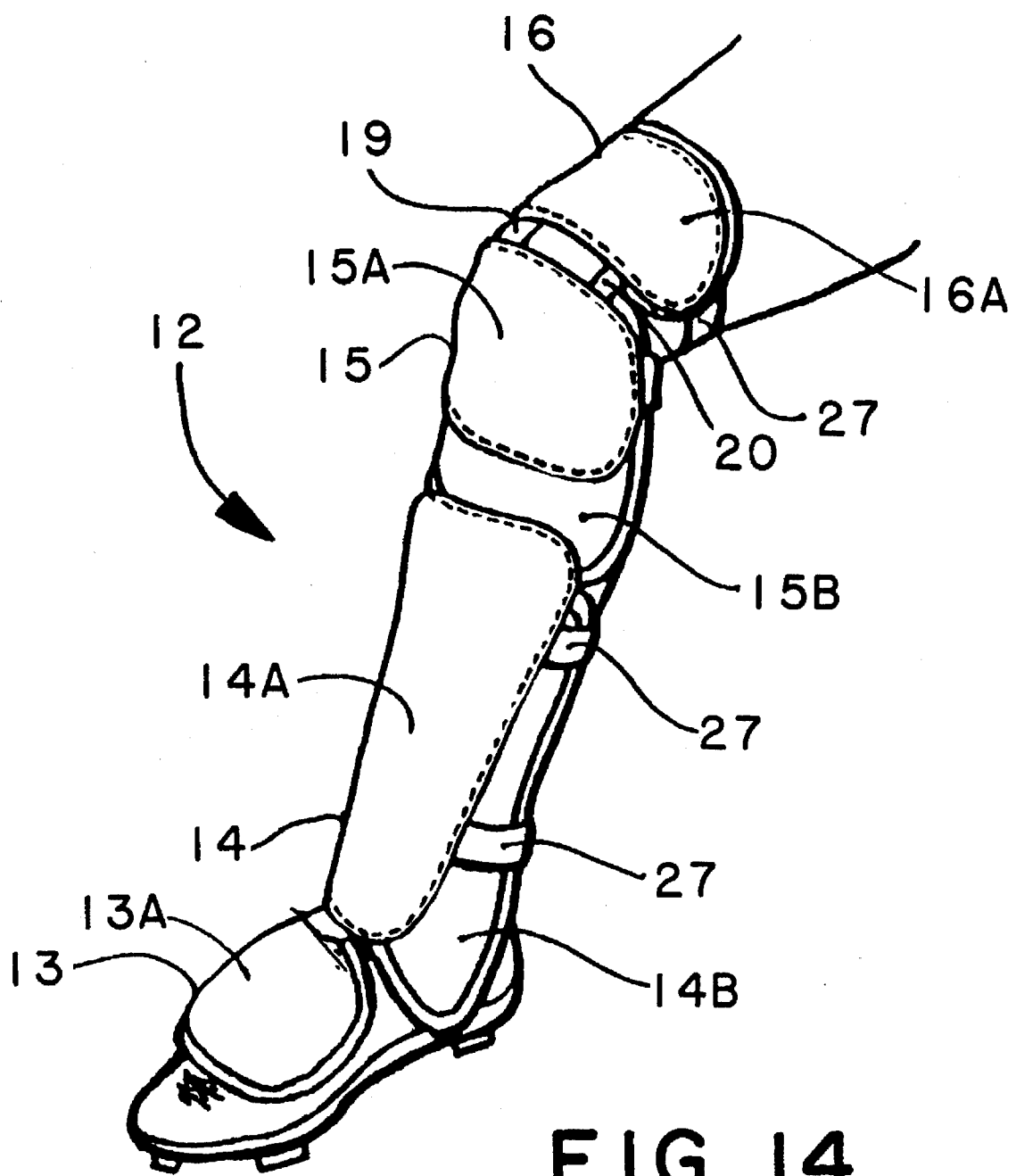

FIGS. 6A, 6B; 7A, 7B; 8A, 8B; and 9A, 9B are simplified vertical cross-sections of the intermediate layer of a pad segment of the invention according to several variations, shown in their respective unmolded and molded conditions;

FIGS. 10–13 show progressive stages of application of the shin protector to a leg; and FIG. 14 shows a completed shin protector in place on the leg to which it was molded in FIGS. 10–13.

DESCRIPTION OF THE PREFERRED EMBODIMENT AND BEST MODE

Figure 1:
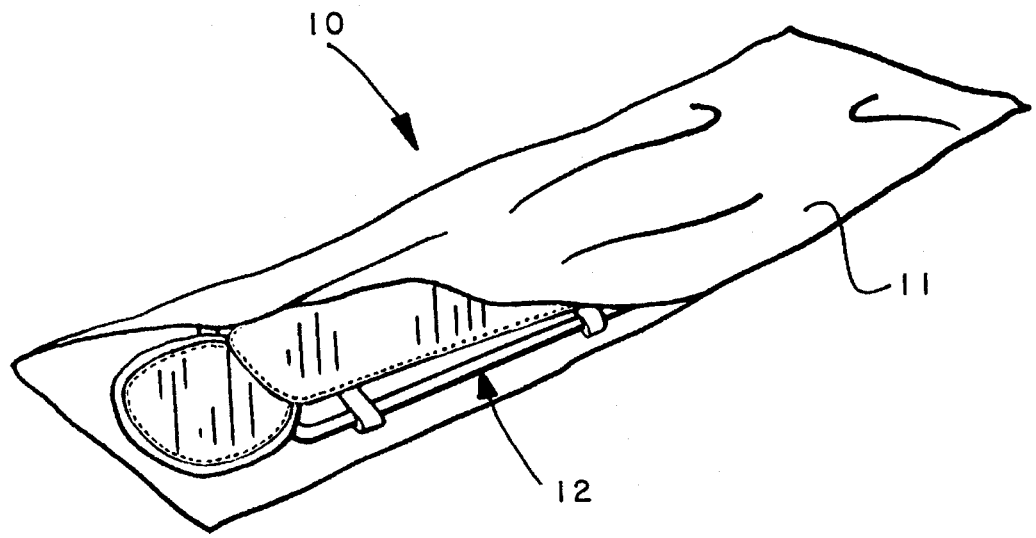
FIG. 1 is a perspective view showing the outer, moisture proof packaging within which the protective pads according to the invention may be stored until use, with parts broken away.

Referring now specifically to the drawings, FIG. 1 illustrates a body part protector assembly 10 assembly according to an embodiment of the invention. The body part protector assembly 10 assembly includes as its outermost protective enclosure an outer moisture-impervious laminated foil pouch 11 in which the other components are sealed in the absence of moisture. The preferred structure of the outer moisture-impervious pouch 11 includes a 0.5 mil aluminum foil sheet sandwiched between two layers of low density polyethylene film, each layer having a thickness of 2 mils. Additionally, the pouch 11 can include an outer layer of laminated 60 gauge bi-axially oriented nylon film. This laminate structure, when properly formed into an envelope and sealed, will prevent moisture intrusion indefinitely. The pouch 11 is shown with a portion of one major side broken away to reveal the contents. For purposes of illustration, a preferred, enabling embodiment of the invention will be explained with reference to a baseball shin protector 12.

Figure 2:
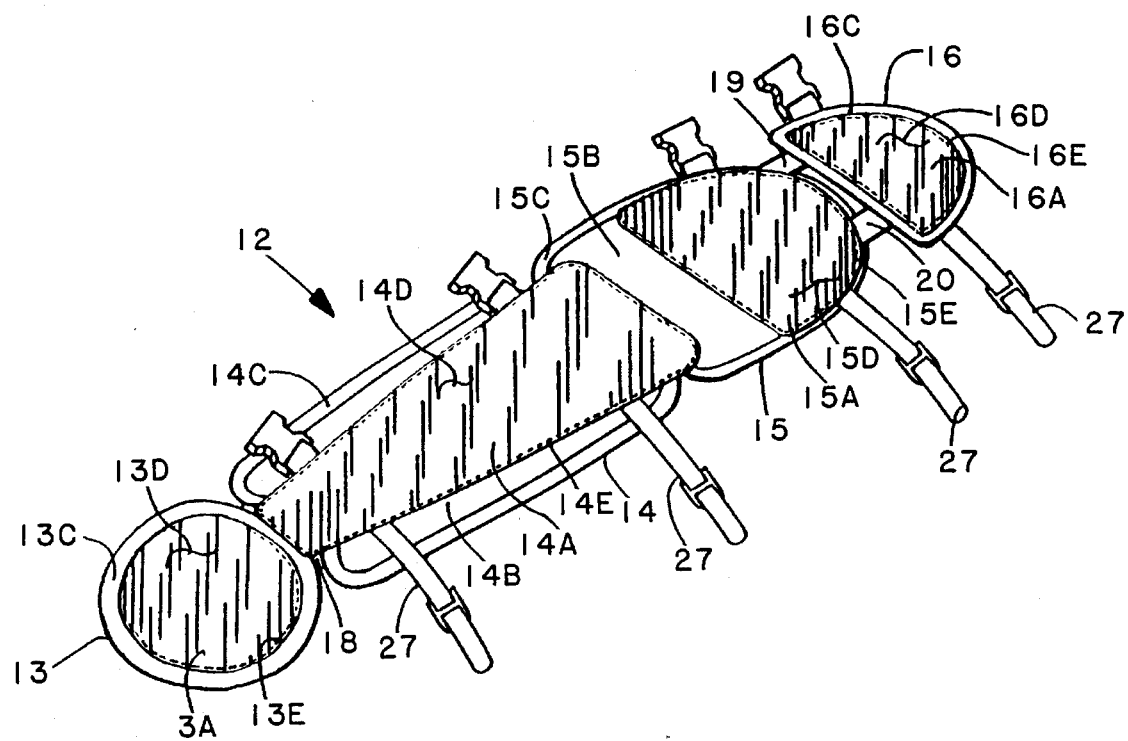
FIG. 2 is a perspective view of the outwardly-facing side of a baseball shin protector according to an embodiment of the invention.
Figure 3:
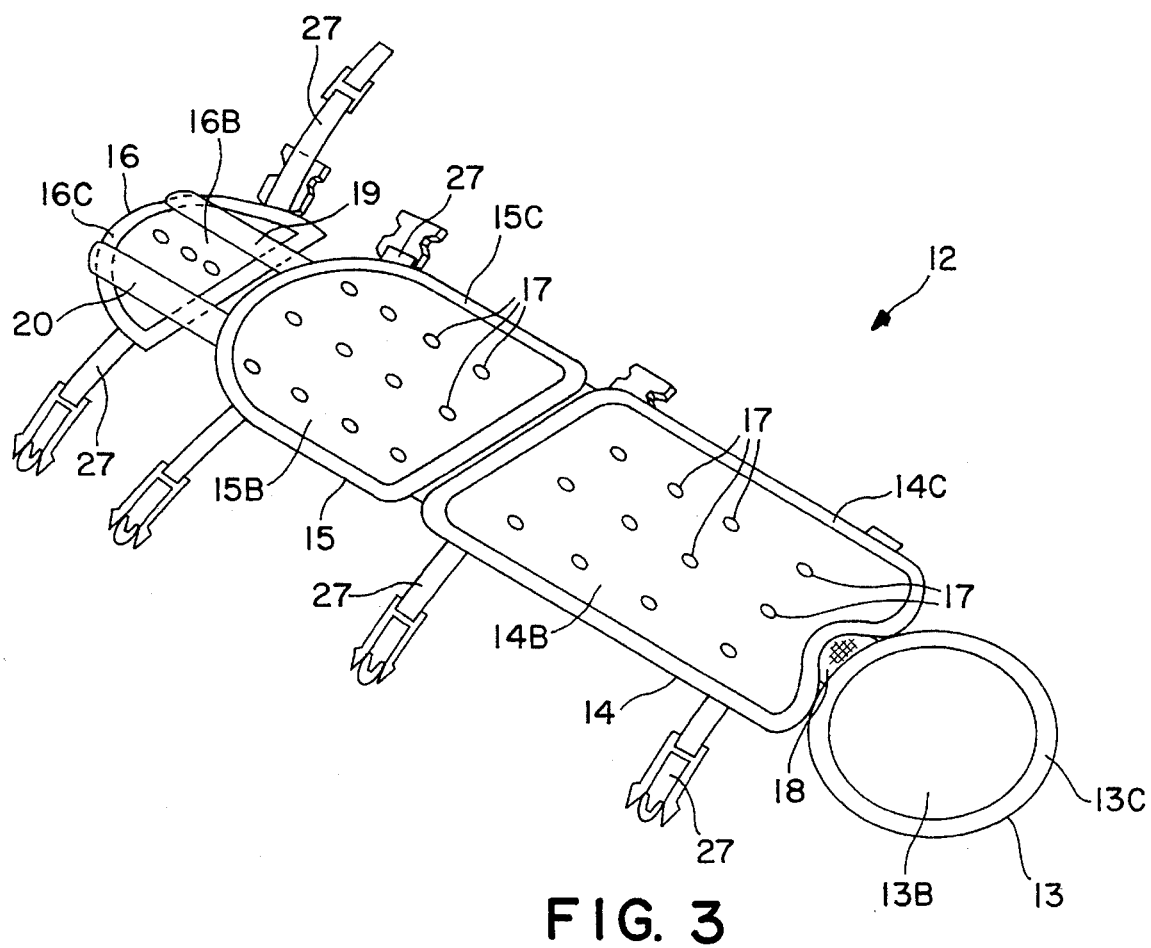
FIG. 3 is a perspective view of the obverse, inwardly-facing side of the baseball shin protector according to the same embodiment of the invention as shown in FIG. 2.

The shin protector 12 is illustrated in FIGS. 2 and 3. The outwardly-facing side of the shin protector 12 is shown in FIG. 2, and the inwardly-facing side is shown in FIG. 3. The shin protector 12 includes four pad segments 13, 14, 15 and 16, as is best shown in FIG. 2. Pad segment 13 protects the upper part of the foot; pad segment 14 protects the shin; pad segment 15 protects the lower part of the knee; and pad segment 16 protects the upper part of the knee. As is best shown in FIG. 3, each of the pad segments 13–16 includes an initially flexible protective layer 13A–16A, respectively, which hardens to form a hard, protective shell. As is best shown in FIG. 3, the inwardly-facing side of the shin protector 12 is formed of protective padding layers 13B–16B, which remain soft and bend to conform to the shape of the protective layers 13A–16A. Foam padding layers 13B–16B are attached to the back of the protective layers 13A–16A by sewing stitches 13E–16E extending around the entire peripheries of each of the protective layers 13A–16A, so that the protective layer 13A is sewn to foam padding layer 13D, and so forth. While not shown in the drawings, rivets spaced at intervals around the periphery of the protective layers can be used to attach them to the padding layers instead of the sewing stitches 13E–16E. Ventilation holes 17 are provided in padding layers 14B–16B to promote air flow in and around the padding layers 14B–16B.

The padding layers 13B–16B are enclosed around their respective peripheries by folded over webbing edge covers 13C–16C, respectively, which are stitched to respective ones of the foam padding layers 13B–16B with a serge or overedge seam.

Pad segment 13 is flexibly attached to pad segment 14 by a short length of webbing 18. Pad segment 14 is attached to pad segment 15 by sewing the top end of the protective layer 14A to the bottom end of the padding layer 15B. Pad segment 15 is attached to pad segment 16 by a pair of webbing strips 19 and 20, as is best shown in FIG. 3. The shin protector 12 is held on the leg by conventional straps 27 with plastic clip snap buckles, shown best in FIGS. 2 and 3.

The protective layers 13A–16A are enclosed within thin envelopes 13D–16D formed of plastic film. The preferred embodiment of the plastic film from which the envelopes 13D–16D are constructed is a 1.5 mil low density polyethylene, with thicknesses up to 4 mils suitable, as well. The film envelopes 13D–16D are penetrated by the line of stitches 13E–16E, thus forming a line of substantial weakness. The film envelopes 13D–16D are easily torn, and when torn, pull loose along the line of the stitches 13E–16E. If rivets are used instead of the stitches, the rivets likewise hold the film envelopes 13D–16D.

Figure 4:
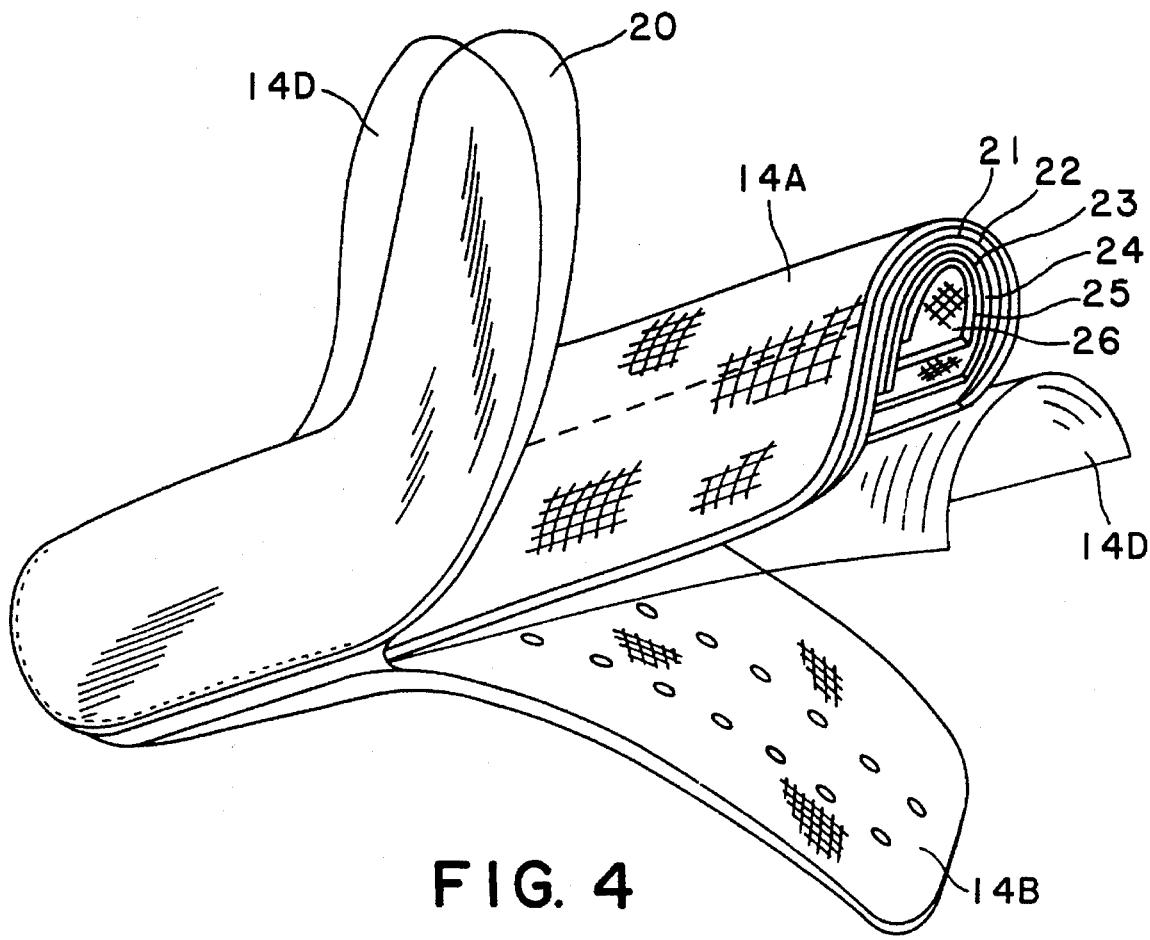
FIG. 4 is a perspective view of a partially-disassembled protective pad segment according to an embodiment of the invention.

Referring now to FIG. 4, a partially-exploded view of the pad segment 14 is shown. Pad segment 14 includes the padding layer 14B, which is preferably a laminated one-eighth inch, four pound EVA (ethylene vinyl acetate) foam. Holes 17 may be provided for ventilation, as described above. The padding layer 14B provides a comfortable surface next to the skin, under sock or uniform, depending on use. The EVA is flexible enough to bend easily with the other components of the pad 14.

Protective layer 14A is coated or impregnated with a moisture-curable resin which is flexible in the absence of moisture, but which rapidly hardens when exposed to moisture. Protective layer 14A in enclosed with a heavy knitted covering 20, such as a product known as Tietex. Protective layer 14A is preferably formed of fiberglass fabric layers 21–26, impregnated with a moisture-curable resin which hardens upon curing to form a rigid structure which retains shape of the body part onto which it is molded during curing. The particular embodiment illustrated in this application contains six layers of fiberglass fabric, but many other variations are equally suitable.

The fiberglass fabric layers 21–26 are impregnated or coated with a moisture-curable resin such as polyisocyanate as described, in full in the present applicant's U.S. Pat. No. 4,770,299. This reactive system remains stable when maintained in substantially moisture-free conditions, such as in the moisture-impervious pouch 11, but hardens upon exposure to sufficient moisture to form a rigid, self-supporting structure. A typical formulation of the reaction system is set forth in the following table:

---

| Typical Formulation: |
|---|
| Isonate↓ 143L    or |

-continued

| Typical Formulation: | | |
|---|---|---|
| Mondur↓ CD or Rubinate ↓ XI168 | polyisocyanate | 50.0% |
| Pluracol↓ P1010 | polyol | 46.6% |
| DC-200 Silicone | defoaming agent | 0.30% |
| Benzoyl Chloride | stabilizer | 0.10% |
| Thancat↓ DM-70 | catalyst | 3.0% |
| | | 100% |

A complete discussion of the parameters of the reactive system, the manner of production and the variables which apply are found in U.S. Pat. No. 4,411,262.

The polyisocyanate resin remains in a viscous, liquid unhardened state so long as the resin is not exposed to moisture. This permits the fiberglass protective layer 14A and any flexible structure, such as the padding layer 14B, to remain flexible and moldable so long as the resin is not exposed to moisture, and for a relatively short period of time after exposure to moisture. The curing time can be controlled to some extent by the quantity of water to which the resin is exposed. For example, exposure to water by dipping will result in quite rapid curing, while merely allowing the resin to be exposed to air will cause long curing times proportional to the amount of humidity in the air to which it is exposed.

Figure 5:
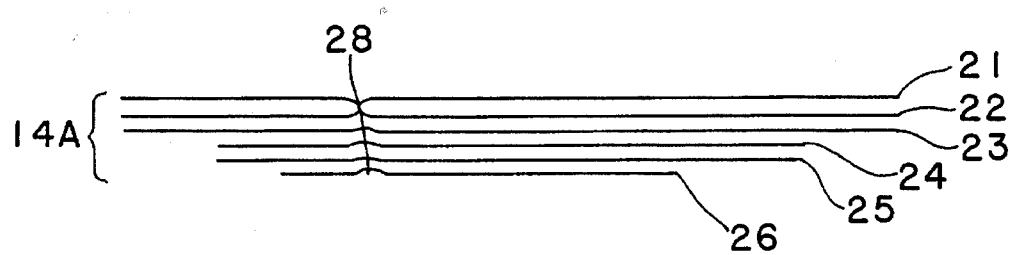
FIG. 5 is a simplified vertical cross-sectional view of the intermediate layers of fiberglass in a pad segment according to an embodiment of the invention.

Referring now to FIG. 5, the fiberglass protective layer 14A is shown schematically in cross-section for purposes of further explanation. As noted above, the protective layer 14A is formed of six fiberglass layers 21–26. The relative widths and dimensions of the layers 21–26 vary due to the irregular shape of the shin protector 12. Generally, the outermost layers 21–23 are the widest. The layers 21–23 provide basic strength to the protective layer 14A from side-to-side while permitting some flexibility.

Layers 24 and 25 are narrower, and provide additional strength in the central part of the protective layer 13A while providing some residual flexing.

The single layer 26 is narrower still and provides further reenforcement for the center of the protective layer 14A. The thinner side edge areas permit better conformance of the protective layer 14A to the body member during molding. After curing is complete, the central, longitudinally-extending area of the protective layer 14A is quite rigid and provides substantial impact resistance, while the edges of the protective layer 14A retain sufficient flexibility to move minimally if pressure is directly applied, while still offering more than adequate protection.

As also shown in FIG. 5, sewing stitches 28 bind the six layers 21-26 together into a loosely-held unit which maintains its longitudinal alignment as it is applied to the body part. Looseness is desirable since the fiberglass layers 21–26 are intended to be bent into an arc. The collective thickness of the layers 21–26 results in substantial lateral shifting of the fiberglass layers 21–26 relative to each other during molding, thus promoting close conformation of the shin protector 12 to the leg. The sewing stitches 28 are applied to the fiberglass layers 21–26 with only slight tension and relatively widely spaced-apart. A stitch length of from six to 10 stitches per inch will provide sufficient looseness to permit the fiberglass layers 21–26 to shift laterally relative to each other while maintaining overall longitudinal alignment. Tension should be sufficiently loose so that there is no tendency for the fiberglass layers 21–26 to be drawn inwardly towards each other by the stitches 28, but conversely, the fiberglass fabric layers 21–26 maintain the spacing from each other naturally caused by the stiffness, thickness and irregularity of the fabric surfaces. The stitches 28 are put in sufficiently loosely so that there is no tendency for the stitches to perforate the fiberglass fabric layers along the line of the stitching.

Note that the stitches 28 are applied asymmetrically, that is they extend along the length of the protective layer 14A closer to one side edge than to the opposing side edge. This enables the fiberglass fabric layers 21–26 to shift to a greater degree than if the stitches ran down the center of the protective layer 14A.

It has been determined that this structure, generally referred to as a "pyramid structure" disperses impact across the width of the body part more efficiently than a pad with multiple layers, all having the same width.

The particular embodiments disclosed above are for purposes of illustration. Many other variations are possible while remaining within the scope of the invention. Several other possible constructions for the intermediate layer according to the invention are shown in FIGS. 6A–9B. In each case, the "A" illustration shows the arrangement of the multiple layers of fiberglass fabric, and the "B" illustration shows the same construction in its position as formed around a body part such as a leg.

FIGS. 6A and 6B show an protective layer 30 in its original and formed configurations. Protective layer 30 includes separate, relatively wide fiberglass layers 31, 33, 35 alternated with relatively narrow fiberglass layers 32, 34, and 36. These layers 31–36 are impregnated or coated with a moisture-curable resin such as polyisocyanate as described in full in the present applicant's U.S. Pat. No. 4,770,299 and above. The reactive system remains stable when maintained in substantially moisture-free conditions but hardens upon exposure to sufficient moisture to form a rigid, self-supporting structure.

Figure 7A:
Figure 7B:
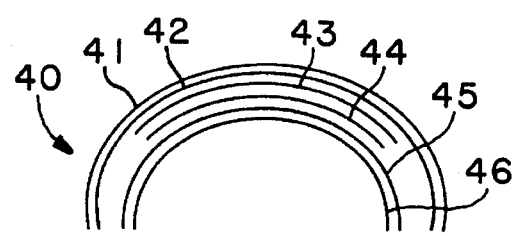

FIGS. 7A and 7B show an protective layer 40 in its original and formed configurations. Protective layer 40 includes two separate, relatively wide fiberglass layers 41, 42, two narrow fiberglass layers 43, 44, positioned in the middle of the layer 40, and two relatively wide fiberglass layers 45, 46. The fiberglass layers 41–46 are impregnated or coated with a moisture-curable resin such as polyisocyanate as described in full in the present applicant's U.S. Pat. No. 4,770,299 and above. The reactive system remains stable when maintained in substantially moisture-free conditions but hardens upon exposure to sufficient moisture to form a rigid, self-supporting structure.

Figure 8A:
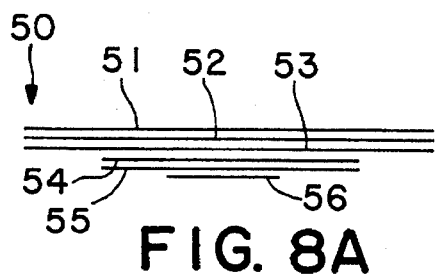
Figure 8B:
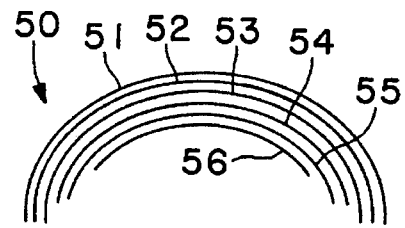

FIGS. 8A and B show an protective layer 50 in its original and formed configurations. Protective layer 50, is very similar to the one shown in FIGS. 6 and 7, but is included to illustrate that the relative dimensions of the various layers can vary with respect to each other, even though the overall configuration of the protective layer stays the same. In Figures 8A and 8B the narrower layers decrease in width to a greater degree than in the example shown in FIG. 6 and 7. Whereas in FIGS. 6 and 7 the layers are five, four and three inches wide, respectively, in FIGS. 8A and 8B, the layers 51, 52 and 53 are five inches, whereas the layers 54 and 55 are three inches, and the innermost layer 56 is two inches wide. The layers 51–56 are impregnated or coated with a moisture-curable resin such as polyisocyanate as described in full in the present applicant's U.S. Pat. No. 4,770,299 and above. The reactive system remains stable when maintained in substantially moisture-free conditions but hardens upon exposure to sufficient moisture to form a rigid, self-supporting structure.

Figure 9A:
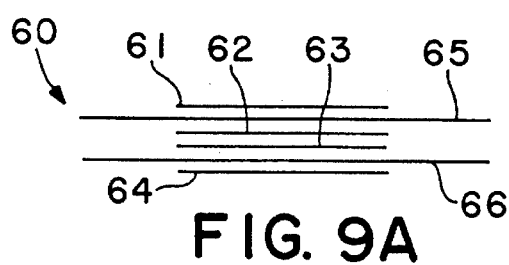
Figure 9B:
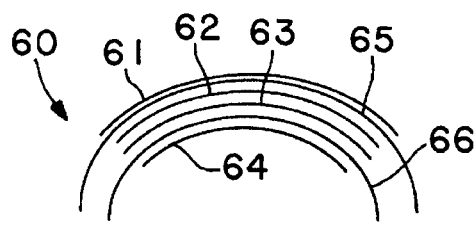

FIGS. 9A and 9B show an protective layer 60 in its original and formed configurations. Protective layer 60 includes separate, relatively narrow fiberglass layers 61, 62, 63, and 64, with two relatively wide fiberglass layers 65 and 66 positioned in the middle of the layer 60 between fiberglass layers 61 and 62, and 63 and 64, respectively. The fiberglass layers 61–66 are impregnated or coated with a moisture-curable resin such as polyisocyanate as described in full in the present applicant's U.S. Pat. No. 4,770,299 and above. The reactive system remains stable when maintained in substantially moisture-free conditions but hardens upon exposure to sufficient moisture to form a rigid, self-supporting structure.

The number of layers of fiberglass in the protective layer can be varied to take into account anticipated use conditions. Also, as mentioned above, other materials such as a fabric formed of polypropylene can be used in substitution for some of the layers. Also, even though the stitches by which the layers are held together are not shown in FIGS. 6A–9B, it is understood that the layers will be stitched together with wide, loose stitches to keep the layers together as a unit while permitting shifting as needed permit the layers to conform to the curvature of the body part to which the pad is being molded, generally as illustrated in FIG. 5.

Figure 10:
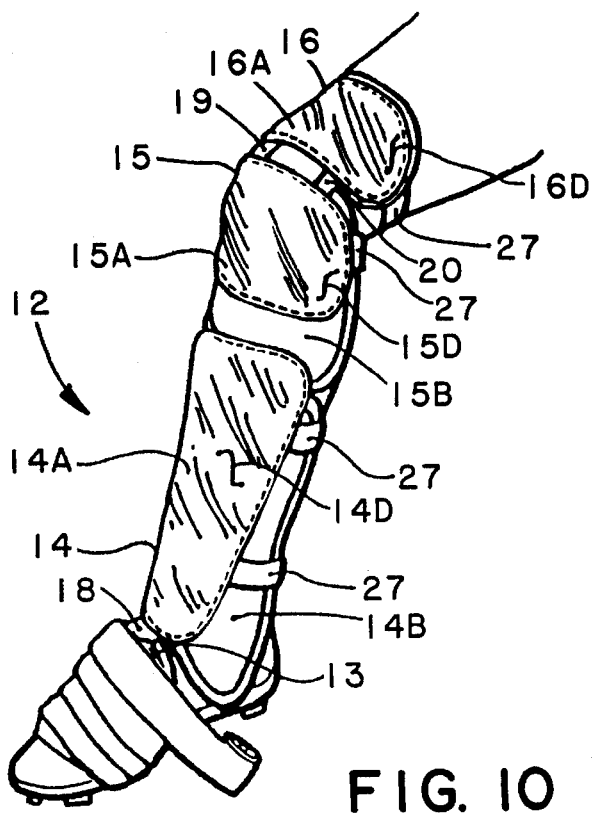

Application of the shin protector 12 according to the above description is now explained. As noted above, the storage life of the shin protector 12 within the heavy foil pouch 11 is indefinite. When ready for application, the foil pouch 11 is cut with a knife or scissors, and the shin protector 12 is removed. When removed, the entire structure of the shin protector 12 is soft and relatively flexible. Ideally, the shin protector 12 is applied over the shoe and uniform of the wearer exactly as they will be worn during use, and held in place with the straps 27. Preferably starting from one end and moving to the other, the plastic film of the envelope 13D is removed from the pad segment 13, exposing the protective layer 13A. As noted above, the film of the envelope 13D is very thin and easily torn. The film will tend to tear where perforated by the stitches 13E. As is shown in FIG. 10, having exposed the protective layer 13A, it is wetted with water and immediately applied over the shoe of the wearer. After carefully forming the pad segment 13 over the top of the foot, the pad segment 13 is wrapped with a heavy strap or bandaging material. The belts 27 should not be used alone to conform the shin protector 2 to the leg, since they will not by themselves provide sufficient pressure on all parts of the shin protector 12 to create and uniformly molded shape along the entire length of the shin protector 12.

The envelopes 14D–16D are left intact, and prevent either water used to wet the protective layer 13A or atmospheric moisture from hardening the other pad segments 14–16.

Figure 11:
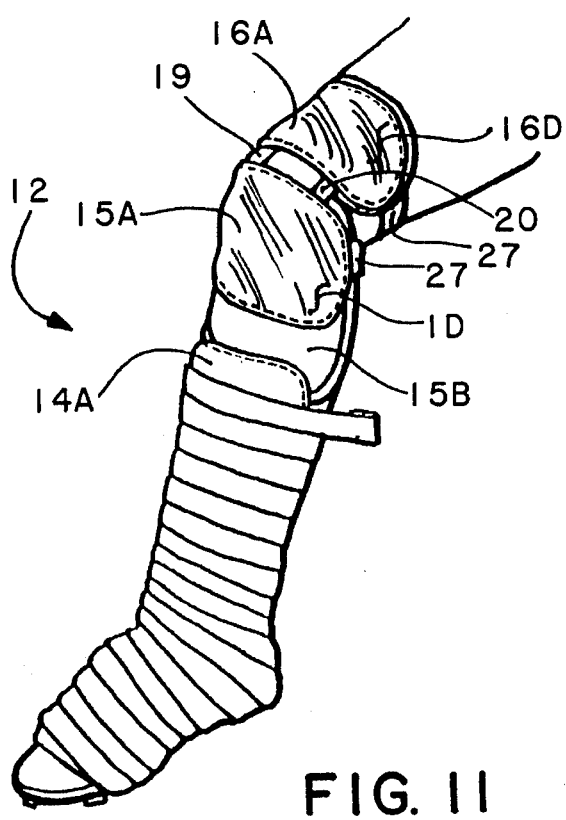

As is shown in FIGS. 11, 12 and 13, the steps described above are repeated, successively removing envelopes 14D, 15D and finally 16D to expose the protective layers 14A, 15A and 15A, respectively, for wetting and immediate molding to the leg, followed by wrapping, as illustrated.

In no more than approximately 10 minutes, the entire shin protector 12 has hardened fully, and the wearer has a completely custom-fitted shin protector, as is shown in FIG. 14. The same process is repeated with a second shin protector 10 for the other leg. An identical shin protector 12 can be used for both left and right legs. Alternatively, if the male portion of the buckle of the straps 27 is preferred on the outside aspect of both legs, then shin protector 12 will be so constructed and indicated on the packaging.

In either case, a pair of shin protectors 12 can be packaged together according to the disclosure of applicant's application Ser. No. 08/306,811.

A custom-fitting body part protector with cure-retarding storage system, method of constructing a body part protector, and method of custom-fitting a body part protector is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A body part protector assembly for being custom-fitted to a body part, and comprising:

(a) a body part protector having at least two connected-together pad segments, each of said pad segments having an initially flexible protective layer comprised of a fabric impregnated with a moisture-curable resin which hardens upon curing to form a rigid structure which retains a body part-defined shape into which it is molded during curing;

(b) respective removable covers separately covering and enclosing each of the at least two connected pad segments, and being individually removable from their respective pad segments to expose the initially flexible layer of that pad segment when the body part protector is to be wetted and fitted to the body part for curing into the proper molded shape, said removable covers having moisture transmission-retarding properties for enabling each pad segment to be individually and sequentially fitted to the body part without other pad segments being wetted and cured before fitting of that pad segment is complete; and (c) an outer moisture-proof protective pouch within which said body part protector is sealed for storage in the absence of moisture until the pad is to be molded to the body part to be protected.

2. A body part protector assembly according to claim 1, wherein said body part protector includes a flexible inner cushion layer positioned on an inner side of the resin-impregnated layer for being placed closest to the body member.

3. A body part protector assembly according to claim 1, wherein said fabric comprises a plurality of overlaid thicknesses of fiberglass.

4. A body part protector assembly according to claim 3, wherein said plurality of thicknesses of fiberglass comprises at least five thicknesses and no more than seven thicknesses.

5. A body part protector assembly according to claim 1, wherein said removable covers comprise sheets of plastic film.

6. A body part protector assembly according to claim 5, wherein said plastic film has a thickness of between 1.5 mils and 4 mils.

7. A body part protector assembly according to claim 1, wherein said outer moisture-proof protective pouch is formed of a laminated structure having at least one layer of plastic film and at least one layer of aluminum foil bonded to the plastic film.

8. A body part protector assembly according to claim 1, wherein said body part protector comprises a baseball catcher's knee, shin and foot protector.

9. A body part protector assembly according to claim 1, wherein said pad segments include a knee pad segment, a shin pad segment and a foot protector.

10. A body part protector assembly according to claims 1 or 8, wherein said body part protector includes strap means for securing the body part protector to the leg.

11. A body part protector assembly according to claims 1 or 8, wherein said protective cover comprises a plastic film, and wherein said plastic film is sealed around the edge of the respective pad segment for being torn away to expose the pad moisture curable resin.

12. A body part protector assembly according to claim 11, wherein said pad segment includes sewing stitches around the edge thereof, and further wherein the edge of said plastic film is held to the pad segment by said sewing stitches.

13. A method of constructing a body part protector assembly for being custom-fitted to a body part to be protected, and comprising the steps of:
   (a) connecting together at least two pad segments for being form-fitted to a body part to define a body part protector, each of said pad segments having an initially flexible layer comprised of a fabric impregnated with a moisture-curable resin which hardens upon curing to form a rigid structure which retains a body part-defined shape into which it is molded during curing;
   (b) covering and enclosing each of the at least two connected pad segments with respective removable covers, each of said removable covers being individually removable from their respective pad segments to expose the initially flexible layer of that pad segment when the body part protector is to be wetted and fitted to the body part for curing into the proper molded shape, said removable covers having moisture transmission-retarding properties for enabling each pad segment to be individually and sequentially fitted to the body part without other pad segments being wetted and cured before fitting of that pad segment is complete;
   (c) placing the assembled body part protector in an outer moisture-proof protective pouch; and
   (d) sealing the body part protector within the pouch in the absence of moisture until the body part protector for storage until use.

14. A method according to claim 13, wherein said covers comprise plastic film.

15. A method according to claim 14, and including the step of sewing the edge portion of each protective cover to the edge of its respective pad segment.

16. A method of custom fitting a body-part protector to a the body part to be protected, comprising the steps of:
   (a) providing:
      (1) a body part protector having at least two connected-together pad segments, each of said pad segments having an initially flexible layer comprised of a fabric impregnated with a moisture-curable resin which hardens upon curing to form a rigid structure which retains a body part-defined shape into which it is molded during curing;
      (2) respective removable covers separately covering and enclosing each of the at least two connected pad segments, and being individually removable from their respective pad segments to expose the initially flexible layer of that pad segment when the body part protector is to be wetted and fitted to the body part for curing into the proper molded shape, said removable covers having moisture transmission-retarding properties for enabling each pad segment to be individually and sequentially fitted to the body part without other pad segments being wetted and cured before fitting of that pad segment is complete; and
      (3) an outer moisture-proof protective pouch within which said body part protector is sealed for storage in the absence of moisture until the pad is to be molded to the body part to be protected;
   (b) when the body part protector is to be applied, removing the body part protector from its outer, moisture-proof pouch;
   (c) removing a first one of the protective covers from a first pad segment;
   (d) wetting the first pad segment;
   (e) molding the first pad segment to the proper body part for curing and hardening; and
   (f) repeating steps (c), (d) and (e) for each of the other pad segments of the body part protector.

17. A method according to claim 16, wherein protective covers comprise plastic film and the step of removing the plastic film from each of the pad segments comprises tearing the plastic film away from the pad segment.

18. A method according to claim 16, wherein the step of molding the pad segment to the body part comprising conforming the pad segment closely to the shape of the body part and holding the pad segment to the shape of the body part until the pad segment is hardened.

19. A method according to claim 18, wherein the step of holding the pad segment to the shape of the body part comprises the step of over-wrapping the pad segment and the body part while the body part protector is closely conformed to the shape of the body part.

* * * * *